Figure 1:
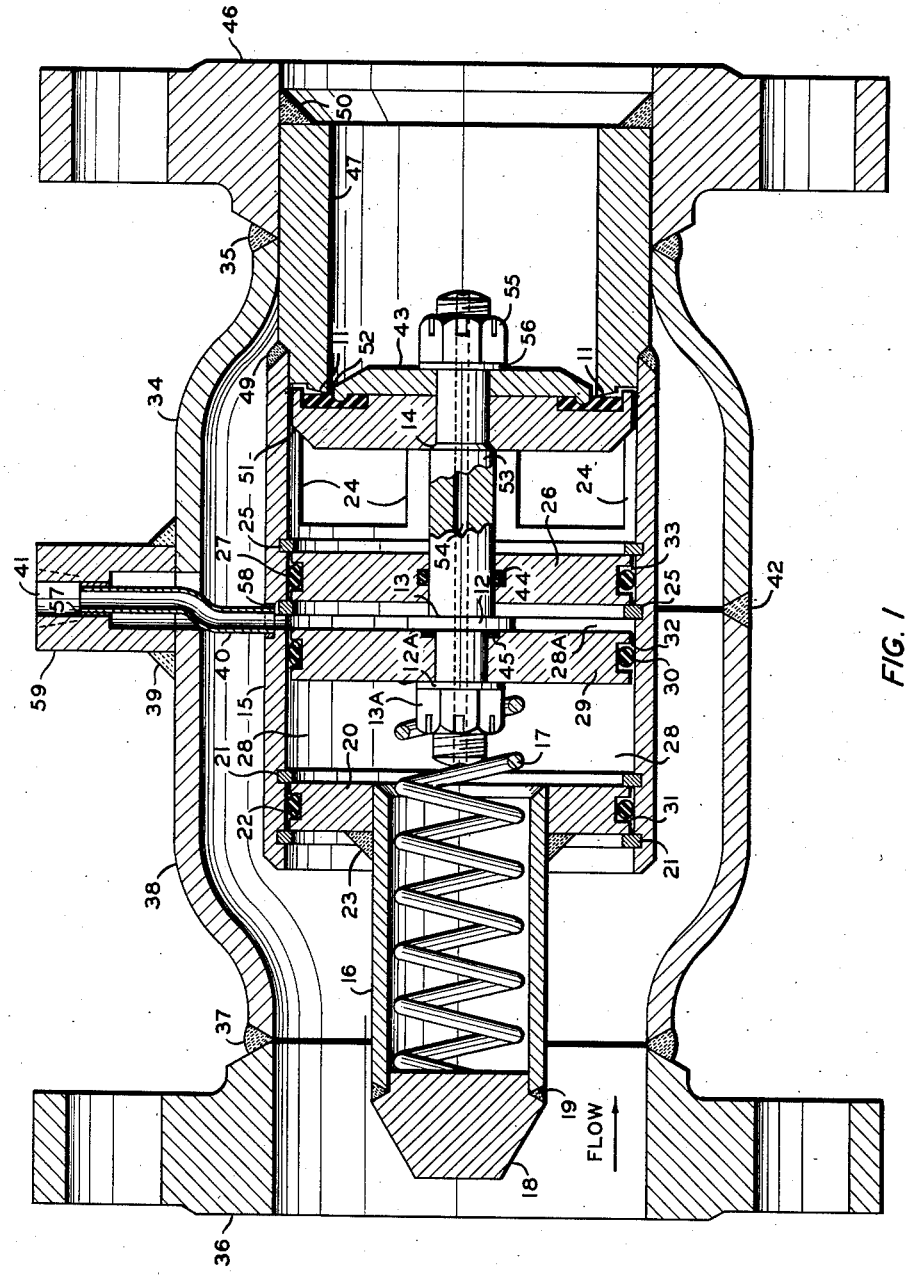

Aug. 21, 1956

E. E. RUSH 2,759,699

ANTI-BACK FLOW MOTOR VALVE

Filed Dec. 26, 1951

2 Sheets-Sheet 1

INVENTOR.
E. E. RUSH

BY *Hudson & Young*

ATTORNEYS

Aug. 21, 1956 — E. E. RUSH — 2,759,699
ANTI-BACK FLOW MOTOR VALVE
Filed Dec. 26, 1951 — 2 Sheets-Sheet 2
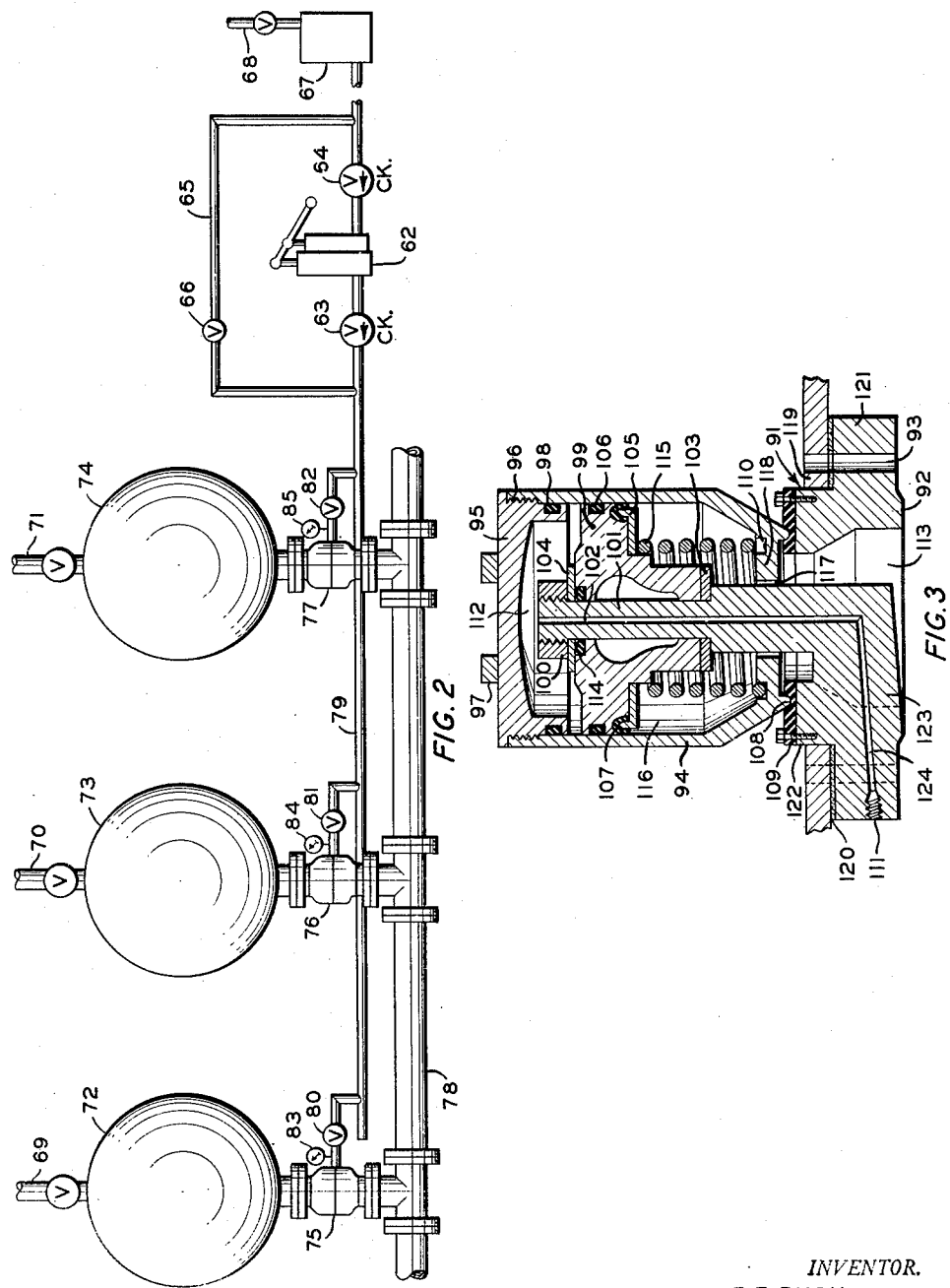
INVENTOR.
E. E. RUSH
BY *Hudson & Young*
ATTORNEYS United States Patent Office 2,759,699
Patented Aug. 21, 1956

2,759,699

ANTI-BACK FLOW MOTOR VALVE

Elton E. Rush, Bartlesville, Okla., assignor to Phillips Petroleum Company, a corporation of Delaware Application December 26, 1951, Serial No. 263,255

4 Claims. (Cl. 251—62)

This invention relates to valves for liquefied petroleum gas service. In one aspect it relates to a bottom outlet valve for use in liquefied petroleum gas storage tanks and similar devices.

Since liquefied petroleum gas is usually stored under pressure, valves for controlling the inflow and out-flow of liquefied gas from tanks present a problem difficult of solution. Such valves cannot be permitted to leak because of contamination of the contents of one tank with the contents of another tank manifolded to the same line. Many valves have been devised for such service but to my knowledge all of these valves present serious objections. For example, many valves have some of their working parts exposed to the atmosphere and in such valves leakage of LPG to the atmosphere frequently causes difficulties in valve operation, and presents a fire hazard. Other valves do not eliminate "back-flow" into a given tank. By the term "back-flow" is meant the opening of the valve by down-stream pressure, which opening permits the flow of one liquid into a tank in which another liquid is being stored.

I have devised an LPG bottom outlet valve which eliminates any possibility of back-flow. My valve, also, has a positive closure means wherein upon release of an operating pressure the valve definitely becomes closed irrespective of any down-stream pressure. In fact, I have devised my valve so that high down-stream pressures assist in actually closing my valve and maintaining it in a closed position.

One object of my invention is to provide a valve for use as a bottom outlet valve in liquefied petroleum gas storage tanks.

Another object of my invention is to provide such a valve which will not permit back-flow.

Another object of my invention is to provide a valve which may be operated from a remote location for convenience, and which may be closed from a remote location in case of an emergency, such as a fire.

Still another object of my invention is to provide such a valve which is positive in operation.

Still another object of my invention is to provide such a valve which is relatively inexpensive to manufacture and to maintain.

Still other objects and advantages of my invention will be realized upon reading the following description, which taken with the attached drawing forms a part of this specification.

In the drawings, Figure 1 is a longitudinal view, partly in section, showing the construction of my valve. Figure 2 is a diagrammatic elevational view of an LPG storage tank assembly in which a plurality of my valves are employed as bottom outlet tank valves. Figure 3 is an elevational view in section of an embodiment of my valve adapted for use as a bottom outlet valve and mounted in contact with the liquid contents of the tank.

While one procedure is described for assembling the structural parts of my valve for exemplary purposes, other procedures may be followed in accordance with good engineering.

Referring now to the drawing and specifically to Figure 1, the valve is composed of a body section 34 and a body section 38. In the assembly of the parts of my valve it is preferable to assemble the working parts prior to the welding together of these two housing members. Thus, in assembling my valve I begin with a flange member 46. To this flange member I attach the housing member 34 by welding at 35.

One end of a sleeve member 47, identified by reference numeral 11, serves as a valve seat. A valve head 51 is provided with a resilient sealing member 52 which seals against seat 11. This resilient sealing member 52 is held in place by a plate member 43 which in turn is held in place by a castellated nut (slotted nut) 55 on one end of a valve stem 53. A washer 56 serves as a bearing between the castellated nut and the plate member 43. A beveled shoulder 14 on the valve head 51 contacts a corresponding bevel on the valve stem so that upon tightening of the nut 55 the valve head 51, the plate 43 and the washer 56 are held tightly together. The valve stem 53 has an axial opening 54 throughout its length.

The cylinder supports 24 may be merely extensions of the cylinder wall 15 and the supports are welded to the sleeve 47 by welds 49. In this cylinder 15 is a piston 29. In the outer periphery of the piston 29 is a slot 32 containing an O-ring seal 30 which is intended to prevent leakage around the piston. The piston is mounted on the other end of the valve stem 53, as shown. The piston is held in its prescribed position on the valve stem and against a washer 12, which in turn contacts a shoulder 13 on the valve stem, by a second washer 12A and castellated nut 13A. An O-ring seal 45 is provided in the piston 29, as shown, to prevent leakage of fluid between the opening in the piston and the valve stem 53.

The end of this cylinder 15 adjacent the valve head 51 is closed by a closure member 26. This closure member is held in place by a pair of snap rings 25, as shown. To prevent leakage of fluid between the periphery of the plate 26 and the inner cylindrical wall, an O-ring seal 27 is provided in a peripheral slot 33. Another O-ring seal 44 is provided to prevent leakage between the valve stem 53 and the closure 26. At the other end of the cylinder 15 is provided a similar closure member 20 which is held in place by a second pair of snap rings 21. This closure member is also sealed against fluid leakage by an O-ring 22 inserted in a peripheral slot 31. This closure member 20 has a circular opening in its center to accommodate a housing 16 and a compression spring 17. This housing 16 is a cylindrical housing held rigidly to plate 20 by a weld 23. A plug 18 is inserted in the open end of the housing 16 and welded at 19.

A tube 40 is inserted into a small opening in the wall of the cylinder 15 and rigidly attached thereto by soldering with a silver solder 58.

After assembly of the above mentioned parts this inner assembly is then welded to the flange 46 by a weld 50.

To the other end of the housing segment 38 is attached another flange 36 by welding at 37, as shown. Housing 38 is then welded to housing 34 by weld 42. At a point at which the tube 40 was inserted into the cylinder 15 is provided sufficient opening in the housing segments 34 and 38 to accommodate the tube 40. The outer end of the tube 40 may preferably terminate in a plug member 59, as shown. The tube 40 is attached to the plug member 59 by silver solder 57. This plug 59 is attached rigidly to the body segments 34 and 38 by a weld 39. The outer end of the plug 59 contains a threaded opening 41 for insertion of a tube, not shown, for carrying hydraulic pressure fluid to and from the valve.

The legend "flow" with a directional arrow in Figure 1 indicates the direction of flow from a tank. In this relation the flange 36 is the flange to be attached to a tank into which or out of which liquid may be pumped.

I will hereinbelow explain the operation of the valve as illustrated in Figure 1. The threaded connection 41 is attached to a source of a hydraulic pressure fluid. Upon flow of this pressure fluid through the tube 40 into the space 28A between the piston 29 and closure member 26 pressure is exerted on the right hand side of the piston 29, which pressure moves the piston from right to left against the bias of the spring 17, against the force on the left side of the piston from space 28 and against any differential across the valve head 51.

It is intended, as a point of distinction of my valve over the prior art valves, that the surface area of the piston 29 exposed to the space 28 is greater than the area of the valve head exposed to down-stream pressure. In this respect down-stream pressure will be transmitted through the opening 54 in the valve stem to the space 28 and because of the larger area of the piston 29 the net force acting on the head of the piston 29 will cause the piston to move from left to right and seat the valve 51. Thus my valve will seat tightly even against down-stream pressure and, in fact, the greater the down-stream pressure the tighter the valve will seat.

To open my valve it is necessary to introduce a hydraulic fluid under pressure through the tube 40 into the space 28A to such a pressure that the total force will be greater than the combined force acting from space 28 against the piston, the biasing effect of the spring 17 and the force differential across valve head 51. When this condition exists the piston 29 will move from right to left and accordingly will open the valve and fluid may flow from right to left or from left to right as desired.

All that it is necessary to do to close the valve is merely release the pressure from the space 28A and the piston 29 will move from left to right.

In Figure 2 is illustrated an assembly of tanks provided with valves similar to the valve illustrated in Figure 1. For assembly purposes I have shown an assembly of tanks 72, 73 and 74. While I have shown three tanks it is obvious that such an assembly may consist of any desired number of tanks. These tanks are provided with connections to which the valve assemblies 75, 76 and 77 are attached, as shown. The lower ends of these valve assemblies are attached to a line 78 for flow of fluid into or out of the tanks. A conduit 79 is provided for flow of a pressure fluid for the opening of the valves 75, 76 and 77. This pressure fluid is supplied from a reservoir 67 having a tube 68 provided for addition of oil from a source, not shown, into the reservoir. From the reservoir 67 this fluid flows through the line 79, through a check valve 64 to a manually or power operable pump 62, through another check valve 63 and thence on through the line 79 to one or more of the tank valves. A by-pass line 65 around the pump and check valves containing a valve 66 is provided for flow of fluid when it is desired to by-pass the pump 62. From the line 79 are conduits containing valves 80, 81 and 82 for controlling flow of pressure fluid to the valves 75, 76 and 77, respectively. Pressure gages 83, 84 and 85 are provided for indicating pressure at valves 75, 76 and 77, respectively.

Referring to Figure 2, the hydraulic pressure fluid in reservoir 67 is pumped by pump 62 through the check valves 64 and 63. In case it is desired to open the valve 77 to permit flow of liquefied petroleum gas into or out of tank 74, the valve 82, which may preferably be a needle valve, is opened. Upon applying fluid pressure by means of pump 62 the piston and valve as illustrated in Figure 1 (of valve assembly 77) will open and permit flow of LPG into or out of the tank 74 through the manifold line 78. While applying pressure from the pump 62 to the valve 77 the valve 66 in the by-pass line 65 must be closed. When sufficient LPG has been admitted to tank 74 or removed therefrom and it is desired to close the valve 77, it is merely necessary to open the by-pass valve 66 in line 65 and to open the needle valve 82, if it has been closed, to permit the exhausting of fluid from the space 28A through the line 79 and through the by-pass line 65 into the fluid reservoir 67. Upon opening of the valve 82 and the valve 66 this fluid tends to flow from the space 28A because of the force differential across the valve 51 and the force in the space 28 pushing on the left hand side of the piston. These forces are supplemented by the action of the spring 17 with the result that the valve 51 closes immediately with the exhausting of the pressure fluid from the space 28A.

Tank 73 or the tank 72 may be filled or emptied in exactly the same manner as described in relation to the tank 74. Individual pressure fluid lines may be run to each valve 75, 76 and 77, from the pump so that these valves may be operated from a distance in case of an emergency.

In Figure 3 is illustrated another form of hydraulically operable valve embodying the principles of my invention. This valve includes a flange member 91 which is attached to the exterior of a tank with the flange portion 121 bolted on the outer side of a tank flange 119 and the small diameter portion 122 extending into the tank. The inner end of this small diameter portion 122 terminates as a flat annular surface to which is attached a resilient valve sealing member 109 as shown. Coextensive with the flange 121 is a member 123 which extends through the center of the valve conduit. From this central member a stationary piston rod element 101 extends some distance at right angles to the plane of the flange 121 and into the tank. On the end of this piston rod 101 is placed a washer 103, then a piston 99, a second washer 104 and finally a threaded nut 100. Disposed in a small groove in the upper face of the piston 99 is an O-ring seal 114. The threaded nut 100 is intended to hold tightly in place these several elements on the piston rod 101. Disposed around and cooperating with the piston 99 is a movable cylinder 94. The bottom end of this cylinder 94 is closed at 118 with the exception of a centrally located opening through which the piston rod 101 extends. With the cylinder 94 disposed around the piston as mentioned, the only open portion remaining in the end wall 118 of the cylinder is an annular opening 117 through which fluid may pass. To prevent leakage between the piston and cylinder, an O-ring seal 106 is provided in the periphery of the piston. A valve seat 108 is provided around the bottom and outer edge of the wall 118 in such a manner that the wall 118 with the valve seat 108 comprises substantially a valve head. The difference between this assembly and an ordinary valve head is the small opening 117, but since the volume 116 within the cylinder and below the piston is liquid-tight this valve head 118 becomes operatively fluid-tight.

An end closure element 95 which might be described as a cylinder head is threaded at 96 to the upper end of the cylinder 94. Wrench lugs 97 are provided on this cylinder head for assembling or disassembling of this head element. An O-ring seal 98 is provided between this head element 95 and the cylinder wall 94 to prevent leakage through the threaded section 96.

Around the lower periphery of the piston 99 is a groove which contains a circular resilient member having an inverted U-shaped cup section. This inverted U of resilient material is held in place by a cup retainer 105. This cup retainer in turn is held in place by a compression spring 115. The compression spring further tends to bias the valve seat 108 against the resilient member 109 so that the valve may be in a normally closed position.

Throughout substantially the entire length of the piston rod 101 is an opening 102 which communicates with an opening 124 in the member 123. The exterior end of this opening 124 terminates as a threaded connection 111. These openings 102 and 124 are intended to provide communication from the exterior of the tank and valve to a space 112 in the head end of the valve cylinder.

The element 123 is relatively small in diameter. Structurally, this element is just sufficiently large to serve as a mechanical base or support for the piston rod 101 and its attached member parts along with the cylinder 94. The space 113 which appears in Figure 3 to be relatively small is in fact quite large since it constitutes the entire cross sectional area minus the small area taken up by the base or support element 123.

A groove 110 is provided in the upper surface of the valve head 118 to serve as a retainer for the compression spring 115.

Between the flange 121 and the tank flange 119 is provided a gasket 120. The surface 92 is an annular surface on the flange 121 against which a gasket and pipe flange, not shown, may be attached when a pipe is attached to the tank for admission or withdrawal of liquid. Illustrated near the edges of the flange 121 are bolt holes 93 for attachment of the valve to the tank flange 119. These same bolt holes may also be used for attachment of the flange of the above mentioned inlet and outlet pipe.

The operation of the valve embodiment illustrated in Figure 3 is substantially the same as the valve illustrated in Figure 1. Since the piston 99 and the piston rod 101 are fixed and immovable in position, upon introduction of hydraulic fluid through conduits 124 and 102 into the space 112, the piston head 95 moves away from the piston such a distance as permitted by the spring. The valve seat 108 breaks contact with the resilient sealing member 109 and in this condition the valve is open. When the valve is in its open position liquid may be introduced into or withdrawn from the tank.

When it is desired to open the valve, pressure fluid is introduced into the space 112 via conduits 102 and 124 until the total force exerted against the head end 95 of the cylinder exceeds the force differential across the valve 108 and the biasing effect of the spring 115. To seat this valve it is merely necessary to release the pressure fluid from space 112 via conduits 102 and 124 until the force differential across the valve plus the bias of the spring exceeds the force of pressure fluid against the cylinder head.

In this embodiment of valve, like that of Figure 1, the diameter of the cylinder space 116 on the tank side of the valve is greater than the diameter of the valve on the side exterior of the tank so that the greater the pressure in space 113 (exterior from the tank) the greater is the tendency for the valve to close.

This valve embodiment of Figure 3 may be installed in such a tank system as that illustrated in Figure 2. When the valve of Figure 3 is used the valve extends inside the tank. The side outlet tubes provided with valves 80, 81 and 82 and pressure gages are attached to threaded openings 111. In this manner, pressure fluid from the storage tank 67 can be pumped by pump 62 and any or all of the valves opened merely by opening of one or more of the valves 80, 81 or 82. When it is desired to close a valve it is merely necessary to cease operation of the pump 62 and open the valve 66 in by-pass line 65 so that the pressure fluid can be exhausted from the space 112 in the valve through the lines 79 and 65 into the tank 67. If it is desired to hold a valve open for a period of time it is merely necessary to operate the pump to open the valve and then close the valve 80. Under this condition the valve will remain open as long as there is no leakage of pressure fluid. A mechanically operated pressure pump 62 with a spring loaded by-pass may be used to maintain fluid pressure in these valves.

A low viscosity lubricating oil fraction serves well as the hydraulic fluid. However, other oils may be used, such as gas oil, kerosene or the like. It is preferable that the oil possess some appreciable viscosity, but yet remain easily flowable at low temperatures.

Operatively the valve embodiment of Figure 3 functions in substantially the same manner as the valve embodiment illustrated in Figure 1.

One important advantage of my valve is that while filling one tank with a given product there can be no back-flow of that product through the manifold line and through the valve into another tank containing the same or another product because the greater the back pressure of fluid against the valve 51 or valve 118 the greater is the seating force of these valves.

Materials of construction may be selected from among those commercially available taking into account corrosive properties of the fluids with which the valves come in contact and mechanical properties.

Not applying to my invention in any manner, but provided for conventional reasons are shown some pipe connections or vent pipes 69, 70 and 71 containing valves in case it is ever desired to vent the tanks from the top or remove gaseous products therefrom or add gaseous products thereto.

The valves of this invention are designed for use in handling liquefied petroleum gas, which has a high vapor pressure, low viscosity, great penetrating power, and which is destructive to gaskets, packing and the like. These liquids are difficult to handle by ordinary valves. Obviously, my valves will easily handle gases and any liquids with lower vapor pressure, although ordinary valves are often entirely unable to handle liquefied petroleum gas safely.

While certain embodiments of the invention have been described for illustrative purposes, the invention obviously is not limited thereto.

I claim:

1. In a valve structure, a stationary valve body having an annular stationary valve seat and an outflow opening through said seat, a movable valve member having an annular valve working surface cooperating with an annular valve working surface formed by said seat, said valve member being disposed on the inflow side of said seat, a cylindrical member extending from the inflow side of said seat, a piston member slidable within said cylindrical member and fitting the same, the outer diameter of said piston member being greater than the mean effective diameter of said valve working surfaces, said valve member being secured to and being movable with one of said cylindrical member and said piston member, a space on one side of said piston member being in unrestricted communication with said outflow opening, a compression spring cooperating with the side of said piston member facing said space, said spring biasing said movable valve member closed against said valve seat, a cylinder closure for the cylindrical member on the side of said piston member opposite said space forming a chamber, and means for establishing communication between said chamber and a source of extraneous controlling pressure fluid to effect movement of said valve member between open and closed positions.

2. In a valve construction, a stationary body member having an annular stationary valve seat and an outflow opening communicating through said seat, a movable valve member having an annular valve working surface cooperating with an annular valve working surface formed by said seat, the valve member being disposed on the inflow side of said seat, a stationary piston carried by the body and disposed on the inflow side of the seat, a cylindrical member extending from the inflow side of said seat, said valve member being formed on and carried by one end of said cylindrical member, said stationary piston being slidable within said cylindrical member and fitting the same, the outer diameter of said piston being greater than the mean effective diameter of said valve working surfaces, the space on that side of the piston which is faced toward the valve seat being in unrestricted communication with the outflow opening and forming a space which is closed to the inflow side of the seat, spring means housed within said cylindrical member and acting between the piston and valve member to urge the latter to a closed position, and an expansible chamber fluid motor comprising a pair of relatively movable members, one secured to said cylindrical member, and the other comprising said piston, said motor being adapted to receive fluid under pressure to effect movement of said valve member between open and closed positions.

3. In a valve construction, a body member having an annular stationary valve seat and an outflow opening through the seat, a movable valve member having an annular valve working surface cooperating with an annular valve working surface formed by the seat, said valve member being disposed on the inflow side of the seat, a cylindrical member extending from the inflow side of the seat, said valve member being formed on and carried by one end of the cylindrical member, a piston carried by said body member and having a sealed fit with respect to said cylindrical member, the outer diameter of said piston being greater than the mean effective diameter of said valve working surfaces, a compression spring interposed between said piston and said valve member to urge said valve member toward closed position, the space within said cylindrical member and between the piston and said valve working surfaces being in free communication with the outflow side of the valve, and an expansible chamber fluid motor comprising a pair of relatively movable members, one secured to said cylindrical member and the other comprising said piston, said motor being adapted to receive fluid under pressure to effect movement of the valve member between open and closed positions.

4. The valve structure of claim 1 wherein said valve member is secured to and is movable with said piston member.

References Cited in the file of this patent

UNITED STATES PATENTS

| Number | Name | Date |
|---|---|---|
| 589,124 | Evertsen | Aug. 31, 1897 |
| 737,706 | Chambers | Sept. 1, 1903 |
| 986,184 | Lilly | Mar. 7, 1911 |
| 1,087,399 | Phelps | Feb. 17, 1914 |
| 1,980,063 | Jensen | Nov. 6, 1934 |
| 2,169,452 | Ricardo | Aug. 15, 1939 |
| 2,329,001 | Robinson | Sept. 7, 1943 |
| 2,361,225 | Meyer | Oct. 24, 1944 |
| 2,569,554 | Buttolph | Oct. 2, 1951 |